2 Sheets—Sheet 1.

C. F. T. STEINWAY,

Assignor, by mesne assignments, to himself and W. STEINWAY.

Piano Forte.

No. 9,431. Reissued Oct. 26, 1880.

Witnesses:
Edw.d Payson
Geo. H. Miatt

Inventor:
C. F. T. Steinway
Per Edw. E. Quinby
Atty.

2 Sheets—Sheet 2.

C. F. T. STEINWAY,

Assignor, by mesne assignments, to himself and W. STEINWAY.

Piano Forte.

No. 9,431. Reissued Oct. 26, 1880.

Witnesses:

Edw^d Payson

Geo. H. Miatt

Inventor:

C. F. T. Steinway

Per Edw. E. Lemmey

Atty.

UNITED STATES PATENT OFFICE.

C. F. THEODOR STEINWAY, OF NEW YORK, N. Y., ASSIGNOR, BY MESNE ASSIGNMENTS, TO HIMSELF AND WILLIAM STEINWAY.

PIANO-FORTE.

SPECIFICATION forming part of Reissued Letters Patent No. 9,431, dated October 26, 1880.

Original No. 127,383, dated May 28, 1872. Application for reissue filed June 17, 1880.

*To all whom it may concern:*

Be it known that I, C. F. THEODOR STEINWAY, of the city and State of New York, have invented certain Improvements in Piano-Fortes, which are described in the subjoined specification and illustrated in the accompanying drawings.

My improvements are especially designed for employment in grand piano-fortes, but most of them are also applicable to upright and square piano-fortes.

These improvements relate, first, to the construction of the bottom or bed-plate of the case; secondly, to the construction of the metal frame; thirdly, the mode of supporting the metallic frame, whereby a larger area of the sounding-board is left uncovered and the metal frame is kept out of contact with the sounding-board, and hence does not interfere with its freedom of vibration; fourthly, to a mode of combining the metal frame with the wooden frame of a piano, whereby the wooden frame is made to contribute to the rigidity of the iron frame; fifthly, to the combination, with the iron frame, of a metallic wedge or stretcher which may be removed for the purpose of allowing free access to the iron frame for the application of the treble-strings, and may be afterward inserted for the purpose of strengthening the iron frame and increasing its capacity to resist the pull of the strings.

Figure 1:
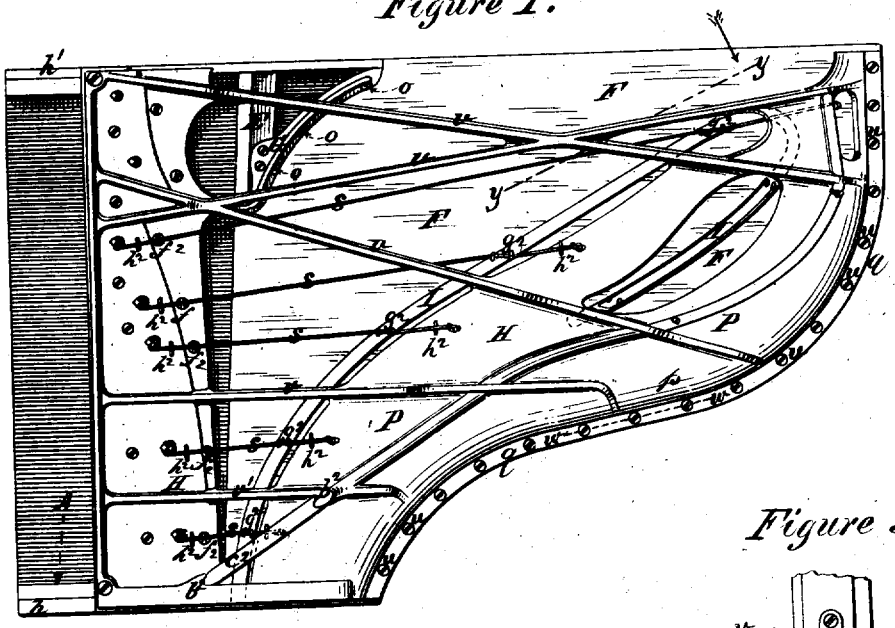
Figure 3:
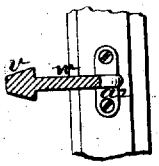
Figure 2:
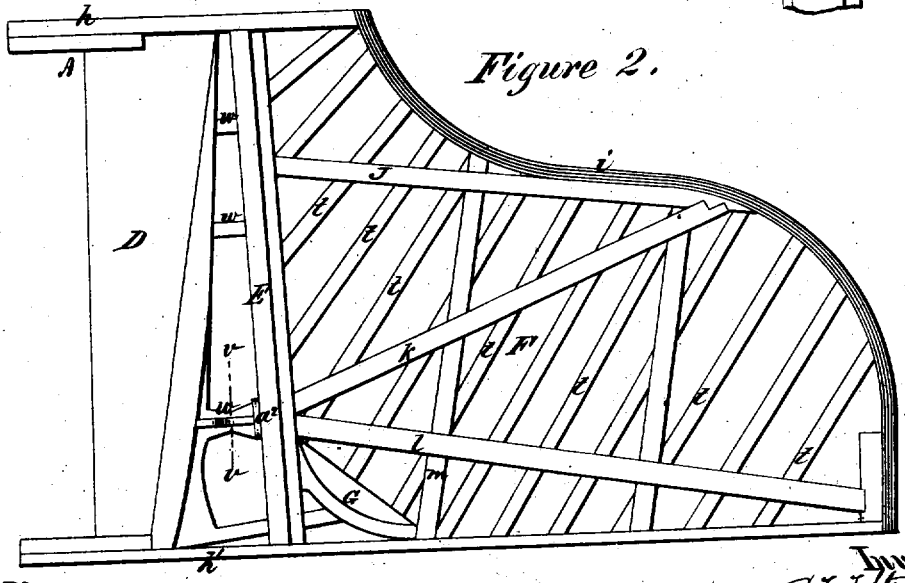
Figure 6:
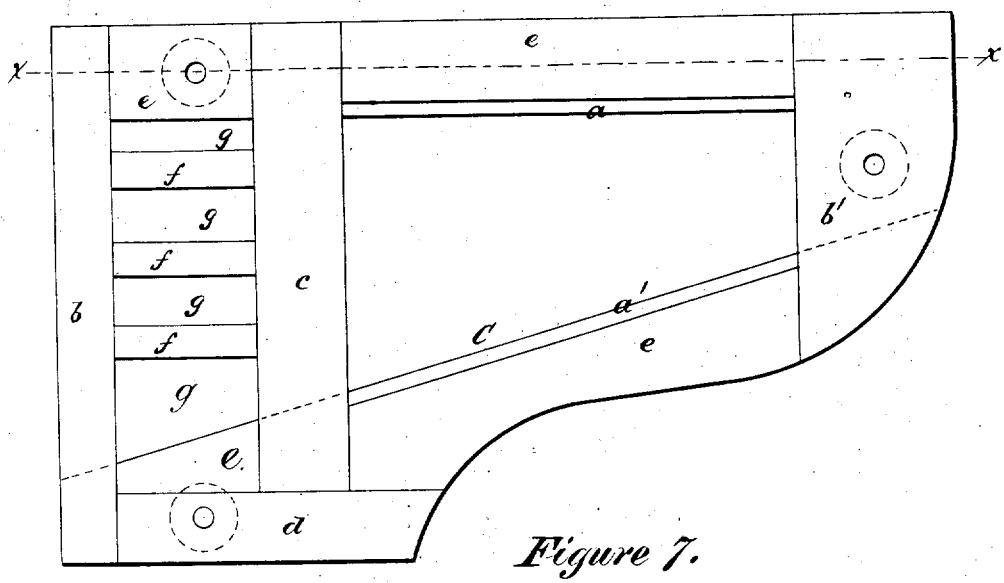
Figure 7:
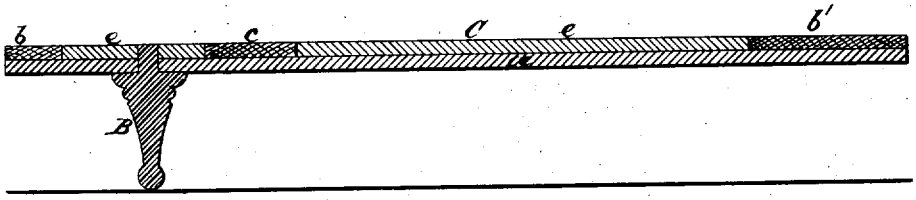
Figure 4:
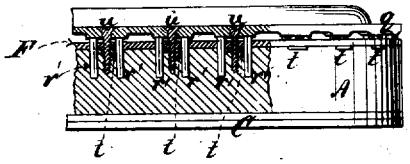
Figure 5:
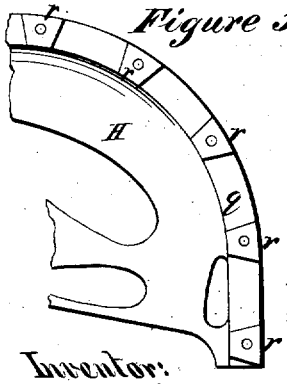
Figure 8:
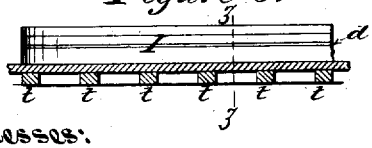
Figure 9:
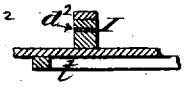

In the accompanying drawings, which represent my improvements embodied in a grand piano-forte, Figure 1 is a top view of the iron frame and the parts upon which it rests. Fig. 2 is a view of the under side of the sounding-board and of the wooden frame of the piano-forte. Fig. 3 is a transverse section, through the line *v v* on Fig. 2, of one of the wedge-braces, which serves to transmit to the iron frame the support of the wooden frame. Fig. 4 is a vertical section of the piano-forte through the line *w w* on Fig. 1. Fig. 5 is a view of the under side of a portion of the metal frame. Fig. 6 is a top view of the bed-plate of the case. Fig. 7 is a longitudinal section of the same through the line *x x* on Fig. 6. Fig. 8 is a section of the sounding-board through the line *y y* on Fig. 1, showing the construction of the sounding-board bridge. Fig. 9 is a transverse section of the sounding-board through the line *z z* on Fig. 8.

The drawings represent the wooden case A of a grand piano-forte of the usual form, supported by the legs B. The bottom or bed-plate C of the case, as will be seen, is constructed of two layers of wood, the lower layer consisting of two strips, *a* and *a'*, extending the entire length of the bottom upon its sides, and connected at their opposite ends by transverse strips fastened between them, upon which are glued the superposed transverse end strips, *b* and *b'*, which extend across the two side strips, *a* and *a'*, as shown in Fig. 6.

An intermediate transverse strip, *c*, is fastened upon the lower longitudinal strips *a* and *a'*, and abuts at one end against the superposed longitudinal strip *d*, which is glued upon the lower longitudinal strip *a'*.

Between the parallel transverse strips *b c* and *c b'*, respectively, are placed the superposed side strips, *e e e e*, and in addition I connect the transverse strips *b* and *c* by parallel longitudinal strips *f f f*, the spaces between the last-named strips being filled out by the panels *g g g g*.

This construction of superposed strips of wood glued together affords a bed-plate of superior lightness and strength.

The construction of the wooden frame of my case will be best understood by referring to Fig. 2, in which it will be seen that the rim of the case is composed of the shorter side timber, *h*, and the longer side timber, *h'*, the inner ends of which are respectively united to the opposite ends of the sinuated side *i*, which is, by preference, built up of a number of superposed layers or veneers of wood, glued upon each other and pressed into the desired form. The wrest-plank D is fastened to the parallel sides, which are also united to the cross-timber E, the top of which, together with the top of the rim, forms the support of the sounding-board F.

I also unite the cross-timber E with the rim of the case by the three longitudinal braces *j*, *k*, and *l*, two of which, *k* and *l*, converge toward and meet upon the cross-timber E, as shown in Fig. 2, while the third, *j*, extends from the cross-timber to the curved part of the rim, where it meets the back end of the brace *k*. With these longitudinal braces and the rim are combined two or more cross-braces, *m m*.

The sounding-board F is fastened to the top of the rim—or, in other words, the edge of the case A—and the top of the cross-timber E, by means of glue, or in any other desirable manner, and it is exposed to the action of the compressing-screws *o o o o*, inserted into the end of the sounding-board, as shown in Fig. 1, and having their heads bearing outwardly against the metallic bridge G, extending from the cross-timber E to one of the cross-braces *m*.

My metal frame H consists of a suitably-ribbed front cross-plate, which rests upon the sounding-board, and which is united by the bars *v v v v* and *v'* with the web P, the outer edge, *p*, of which is downwardly curved and provided with the horizontal flange *q*, conforming in shape with the sinuated part of the rim. This flange is provided upon its under surface with projections *r*, which bear upon the upper ends of the dowel-pins *r'*, inserted into the rim of the case A and extending upward through and slightly above the sounding-board. By this mode of construction the metal frame is kept out of contact with the sounding-board, which is thus left free to vibrate without obstruction.

It has heretofore been customary to secure the iron frame either directly to the upper surface of the sounding-board or to a strip of wood extending around the outer edge of the sounding-board. By supporting the iron frame at intervals upon supports extending upward above the sounding-board, a larger portion of the sounding-board is left free to vibrate, unobstructed by the pressure of the frame, and the singing quality of the tone is thereby much improved.

The dowel-pins are arranged in pairs close to the ends of the ribs *t* of the sounding-board, and they add to the strength of the connection between the sounding-board and the case A. By means of these dowel-pins the metal frame can be supported uniformly at all points, because the dowel-pins can be readily varied in length, and thus adapted to fit any variation in the form of the flange *q* of the metal frame. The frame is fastened to the rim by the screws *u*.

On the under surface of the front plate of the metal frame I provide one or more projecting brackets, *w*, one of which is shown in Fig. 2, which, it will be seen, is immediately opposite the point at which the converging wooden braces *k* and *l* of the case meet. By inserting a metallic wedge, $a^2$, between the edge of the bracket *w* and the cross-timber E, the metal frame is materially strengthened against the tension of the strings.

The iron frame, it will be seen, is slightly arched in longitudinal section, and may be considered as a flattened arc of a circle.

By the introduction of the wedge $a^2$ between the end of the bracket *w* and the cross-timber E, the wooden frame is made to occupy the relation of a chord to the arc of the iron frame, and any tendency of the iron frame to spring under the tension of the strings is resisted by the wooden frame, which, being in the position of the chord of the arc, holds its ends apart.

On the treble end of my metal frame I cast two lugs, $b^2$ $b^2$, for the reception, respectively, of the opposite ends of the wedge-bar $c^2$, which is driven into place after the treble-strings have been affixed, and serves to strengthen this portion of the metal frame against the tension of the strings.

The object of this treble-wedge is the same as that of my treble-bar described in my Patent No. 97,982, and forming the subject of the third claim of the said patent; but by the substitution of my loose wedge-bar in place of the permanently-affixed treble-bar described in my said patent I am enabled to more conveniently adjust the treble-strings on the hitch-pins. The strings, in crossing from the hitch-pins to the tuning-pins, bear upon the sounding-board bridge I, which is provided with a strip, $d^2$, of brass or other metal, (see Figs. 8 and 9,) which may be secured to either side or to the top of the bridge, or may be let into the bridge, as shown. A flat strip of metal or a strip of metal wire may be used for this purpose. By the presence of this strip of metal the capacity of the bridge to transmit the vibrations of the strings to the entire sounding-board, or to that portion of the sounding-board upon which the bridge rests, is materially increased, and the tone of the instrument is improved.

The strings *s* of my piano-forte are supported between the agraffes $f^2$ and the tuning-pins and between the bridge-pins $g^2$ and the hitch-pins by the bridges $h^2$, which are termed the "nodal" bridges, and which are respectively adjusted at points corresponding to one of the nodes of the strings.

By this general construction I am enabled to reduce the size of the instrument, and yet secure a large tone of superior strength and brilliancy.

I claim as my invention—

1. The bed-plate C for the case of a piano-forte, constructed of the longitudinal bottom strips, *a* and *a'*, the transverse strips *b* and *b'* and *c*, and the longitudinal top strips, *d e e e e*, and the strips *f*, all combined in the manner shown and described.

2. The arched edge *p* and flange *q* on the metal frame H of a piano-forte, substantially as set forth.

3. The downward projections *r* from the flange *q* of the metallic frame, substantially as described.

4. The combination of the sounding-board of a piano-forte with an iron frame, the edge of which, superposed upon the edge of the sounding-board, is separated therefrom by supports extending above the sounding-board and arranged at suitable intervals, whereby a larger portion of the sounding-board is left uncovered and is unobstructed in its vibrations, substantially as described.

5. The supporting-dowels $r'$ $r'$, secured in the rim of the wooden case A, in combination with the metal frame and sounding-board of a piano-forte, substantially as described.

6. In a piano-forte with an arched iron frame, a wooden frame fastened to one end of the iron frame and wedged apart from the other end of the iron frame, whereby the wooden frame, occupying the position of a chord to the flattened arc formed by the longitudinal section of the iron frame, resists the tendency of the ends of such arc to spring inward under the tension of the strings.

7. The bracket $w$ and wedge $a^2$, in combination with the metal frame H, and with the converging braces $k$ $l$ of the wooden case A, substantially as described.

8. The treble-wedge $c^2$ and lugs $b^2$ upon and in combination with the bar $v'$ and outside border of the frame H, substantially as described.

C. F. THEODOR STEINWAY.

Witnesses:
CHARLES F. FRETBAR,
PHILIPP BURKARD.